United States Patent
Ju et al.

(10) Patent No.: US 9,330,659 B2
(45) Date of Patent: May 3, 2016

(54) FACILITATING DEVELOPMENT OF A SPOKEN NATURAL LANGUAGE INTERFACE

(71) Applicant: MICROSOFT TECHNOLOGY LICENSING, LLC, Redmond, WA (US)

(72) Inventors: Yun-Cheng Ju, Bellevue, WA (US); Matthai Philipose, Seattle, WA (US); Seungyeop Han, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 501 days.

(21) Appl. No.: 13/775,643

(22) Filed: Feb. 25, 2013

(65) Prior Publication Data
US 2014/0244254 A1    Aug. 28, 2014

(51) Int. Cl.
| | | |
|---|---|---|
| *G10L 15/00* | (2013.01) | |
| *G10L 15/06* | (2013.01) | |
| *G06F 17/27* | (2006.01) | |
| *G10L 15/02* | (2006.01) | |
| *G10L 15/065* | (2013.01) | |
| *G10L 15/22* | (2006.01) | |

(52) U.S. Cl.
CPC ............... *G10L 15/063* (2013.01); *G10L 15/22* (2013.01); *G06F 17/2785* (2013.01); *G10L 15/02* (2013.01); *G10L 15/065* (2013.01); *G10L 2015/223* (2013.01); *G10L 2015/225* (2013.01)

(58) Field of Classification Search
USPC ........ 704/9, 10, 231, 243, 244, 246, 251, 257
See application file for complete search history.

(56) References Cited

U.S. PATENT DOCUMENTS

| | | | |
|---|---|---|---|
| 6,311,159 B1 | 10/2001 | Van Tichelen et al. | |
| 6,658,414 B2 | 12/2003 | Bryan et al. | |
| 7,016,845 B2 | 3/2006 | Vora et al. | |
| 7,092,888 B1 | 8/2006 | McCarthy et al. | |
| 7,280,966 B2 | 10/2007 | Ju et al. | |
| 7,369,984 B2 | 5/2008 | Fairweather | |
| 7,720,682 B2 | 5/2010 | Stephanick et al. | |
| 7,778,837 B2 | 8/2010 | Thiesson et al. | |

(Continued)

OTHER PUBLICATIONS

"International Search Report & Written Opinion for PCT Patent Application No. PCT/US2014/017521", Mailed Date: Aug. 29, 2014, 12 Pages.

(Continued)

*Primary Examiner* — Vu B Hang
(74) *Attorney, Agent, or Firm* — Alin Corie; Cassandra T. Swain; Micky Minhas

(57) ABSTRACT

A development system is described for facilitating the development of a spoken natural language (SNL) interface. The development system receives seed templates from a developer, each of which provides a command phrasing that can be used to invoke a function, when spoken by an end user. The development system then uses one or more development resources, such as a crowdsourcing system and a paraphrasing system, to provide additional templates. This yields an extended set of templates. A generation system then generates one or more models based on the extended set of templates. A user device may install the model(s) for use in interpreting commands spoken by an end user. When the user device recognizes a command, it may automatically invoke a function associated with that command. Overall, the development system provides an easy-to-use tool for producing an SNL interface.

20 Claims, 12 Drawing Sheets

(56) References Cited

U.S. PATENT DOCUMENTS

| | | | |
|---|---|---|---|
| 7,881,936 | B2 | 2/2011 | Longe et al. |
| 8,515,736 | B1* | 8/2013 | Duta .................................. 704/9 |
| 8,909,534 | B1* | 12/2014 | Heath ........................ 704/270.1 |
| 2006/0036438 | A1 | 2/2006 | Chang |
| 2007/0005570 | A1 | 1/2007 | Hurst-Hiller et al. |
| 2007/0042812 | A1 | 2/2007 | Basir |
| 2007/0106496 | A1* | 5/2007 | Ramsey et al. .................... 704/9 |
| 2007/0106497 | A1* | 5/2007 | Ramsey et al. .................... 704/9 |
| 2007/0207821 | A1 | 9/2007 | Tran |
| 2008/0133230 | A1 | 6/2008 | Herforth |
| 2008/0153465 | A1 | 6/2008 | Evermann et al. |
| 2008/0221898 | A1 | 9/2008 | Cerra et al. |
| 2008/0228259 | A1 | 9/2008 | Chu |
| 2010/0010803 | A1* | 1/2010 | Ishikawa et al. ................... 704/9 |
| 2010/0145694 | A1 | 6/2010 | Ju et al. |
| 2012/0078635 | A1 | 3/2012 | Rothkopf et al. |
| 2012/0323557 | A1* | 12/2012 | Koll et al. .......................... 704/8 |

OTHER PUBLICATIONS

Freitas, et al., "Crowd-Sourcing Platform for Large-Scale Speech Data Collection", In VI Jornadas en Tecnología del Habla and II Iberian SLTech Workshop, Jan. 1, 2010, 4 pages.

Han, et al., "NLify: Third-Party Programming Support for Spoken Natural Language Interfaces", Tech. Rep. Microsoft Research, Dec. 1, 2012, 14 Pages.

Liu, et al., "A Collective Data Generation Method for Speech Language Models", In IEEE Spoken Language Technology Workshop, Dec. 12, 2010, pp. 223-228.

Yankelovich, et al., "SpeechActs: A Framework for Building Speech Applications," retrieved at http://citeseerx.ist.psu.edu/viewdoc/download?doi=10.1.1.65.3138&rep=rep1&type=pdf>>, Proceedings of the 13th Annual International Voice I/O Applications Conference, 1994, 10 pages.

Staff, "Building Speech Applications Just Got Easier: AT&T Releases Speech API," retrieved at http://www.research.att.com/articles/featured_stories/2012_07/201207_WATSON_API_announce.html?fbid=YSvWr5MLKwY>>, AT&T Labs Research, AT&T Inc., Dallas, Texas, Jun. 29, 2012, 3 pages.

Glass, et al., "A Framework for Developing Conversational User Interfaces," retrieved at http://citeseerx.ist.psu.edu/viewdoc/download?doi=10.1.1.4.5154&rep=rep1&type=pdf>>, in Computer-Aided Design of User Interfaces IV, Jacob, et al. (eds.), Kluwer Academic Publishers, Netherlands, 2004, 12 pages.

"Why Bitext: Who we are," retrieved at http://www.bitext.com/company.html, Bitext Innovations, S.L, retrieved on Feb. 25, 2013, 2 pages.

Bannard, et al., "Paraphrasing with Bilingual Parallel Corpora," retrieved at <<http://acm.org>>, Proceedings of the 43rd Annual Meeting on Association for Computational Linguistics, 2005, pp. 597-604.

"Contextual Thesaurus FAQ," retrieved at <<http://labs.microsofttranslator.com/thesaurus/thesaurusfaq.html>>, Microsoft Contextual Thesaurus "Learn More" page, Microsoft Corporation, Redmond, Washington, 2 pages.

Bernstein, et al., "Crowds in Two Seconds: Enabling Realtime Crowd-Powered Interfaces," retrieved at <<http://acm.org>>, Proceedings of the 24th Annual ACM Symposium on User Interface Software and Technology, 2011, pp. 33-42.

Bishop, F. Avery, "Speech-enabling a Windows Phone 8 App with Voice Commands," retrieved << http://msdn.microsoft.com/en-us/magazine/721592.aspx>>, MSDN Magazine, 27(11), Nov. 2012, 8 pages.

Chen, et al., "Collecting Highly Parallel Data for Paraphrase Evaluation," retrieved at <<http://acm.org>>, Proceedings of the 49th Annual Meeting of the Association for Computational Linguistics: Human Language Technologies, vol. 1, 2011, pp. 190-200.

Dolan, et al., "Automatically Constructing a Corpus of Sentential Paraphrases," retrieved at <<http://research.microsoft.com/apps/pubs/defaultaspx?id=101076>>, Third International Workshop on Paraphrasing, 2005, 8 pages.

Dumais, et al., "Inductive Learning Algorithms and Representations for Text Categorization," retrieved at <<http://acm.org>>, Proceedings of the Seventh International Conference on Information and Knowledge Management, 1998, pp. 148-155.

Iyer, et al., "What do we perceive in a glance of a real-world scene?," retrieved at <<http://vision.stanford.edu/documents/Fei-Fei_GistJoV2007.pdf, Journal of Vision, 7(1):10, 2007, 29 pages.

Hahn, et al., "Comparing Stochastic Approaches to Spoken Language Understanding in Multiple Languages," retrieved at <<http://IEEE.org>>, Transactions on Audio, Speech, and Language Processing, vol. 19, Issue 6, Aug. 2011, pp. 1569-1583.

"n-gram," retrieved at <<http://en.wikipedia.org/wiki/N-gram>>, Wikipedia article, retrieved on Feb. 22, 2013, 7 pages.

Kok, et al., "Hitting the Right Paraphrases in Good Time," retrieved at <<http://acm.org>>, Human Language Technologies: The 2010 Annual Conference of the North American Chapter of the Association for Computational Linguistics, 2010, pp. 145-153.

Mittal, et al., "Empowering Developers to Estimate App Energy Consumption," retrieved at <<http://acm.org>>, Proceedings of the 18th Annual International Conference on Mobile Computing and Networking, Aug. 2012, pp. 317-327.

Paek, et al., "Handling out-of-Grammar Commands in Mobile Speech Interaction Using Backoff Filler Models," retrieved at <<http://acm.org>>, Proceedings of the Workshop on Grammar-Based Approaches to Spoken Language Processing, 2007, pp. 33-40.

Rosenfeld, Ronald, "Two Decades of Statistical Language Modeling: Where Do We Go From Here?," retrieved at <<http://IEEE.org>>, Proceedings of the IEEE, vol. 88, No. 8, 2000, pp. 1270-1278.

Salton, et al., "A Vector Space Model for Automatic Indexing," retrieved at <<http://acm.org>>, Communications of the ACM, vol. 18, Issue 11, Nov. 1975, pp. 613-620.

Saon, et al., "Large-Vocabulary Continuous Speech Recognition Systems: A Look at Some Recent Advances," retrieved at <<http://IEEE.org>>, IEEE Signal Processing Magazine, vol. 29, Issue 6, Nov. 2012, pp. 18-33.

Sebastiani, F., "Machine Learning in Automated Text Categorization," retrieved at <<http://acm.org>>, ACM Computing Surveys, vol. 34, Issue 1, Mar. 2002, pp. 1-47.

Wang, et al., "Crowdsourcing the Acquisition of Natural Language Corpora: Methods and observations," retrieved at <<http://IEEE.org>>, Proceedings of the IEEE Spoken Language Technology Workshop (SLT), Dec. 2012, pp. 73-78.

Williams, J., "A Case Study of Applying Decision Theory in the Real World: Pomdps and Spoken Dialog Systems," retrieved at <<http://research.microsoft.com/pubs/160914/williams-2010-pomdp-applications-chapter.pdf >>, in Decision Theory Models for Applications in Artificial Intelligence: Concepts and Solutions, Sucar, et al. (eds.), 2011, 34 pages.

Mills, Elinor, "Message Sling offers voice-to-text message service," retrieved at <<http://news.cnet.com/8301-17939_109-10035531-2.html>>, CNET.com, Sep. 8, 2008, 1 page.

"PINGER: text messaging with your voice," retrieved at <<http://www.popgadget.net/2007/09/sponsored_post.php>>, Popgadget, Sep. 2007, 3 pages.

Wang, et al., "Confidence Measures for Voice Search Applications," retrieved at <<http://research.microsoft.com/pubs/75245/2007-yeyiwang-interspeech.pdf>>, Proceedings of Interspeech 2007, 4 pages.

Franz, et al., "Searching the Web by Voice," retrieved at <<http://acm.org>>, Proceedings of the 19th International Conference on Computational Linguistics, vol. 2, 2002, pp. 1-5.

Wang, et al., "An Introduction to Voice Search," retrieved at <<http://research.microsoft.com/pubsT78818/VoiseSearchSigProcMag-2008.pdf>>, IEEE Signal Processing Magazine, vol. 25, No. 3, May 2008, pp. 29-38.

Gilbert, et al., "Intelligent Virtual Agents for Contact Center Automation," retrieved at <<http://web2.research.att.com/export/sites/att_labs/people/Di_Fabbrizio_Giuseppe/library/publications/gilbert_spm_2005.pdf>>, IEEE Signal Processing Magazine, vol. 22, No. 5, Sep. 2005, pp. 32-41.

(56) References Cited

OTHER PUBLICATIONS

Ju, et al., "A Language-Modeling Approach to Inverse Text Normalization and Data Cleanup for Multimodal Voice Search Applications," retrieved at <<http://research.microsoft.com/pubs/78555/is080913.pdf>>, Proceedings of Interspeech 2008, 2008, pp. 2179-2182.

"International Preliminary Report on Patentability Issued in PCT Application No. PCT/US2014/017521", Mailed Date: Jun. 29, 2015, 18 Pages.

Chang, Ana Ramirez, "User-Extensible Natural Language Spoken Interfaces for Environment and Device Control", In Technical Report No. UCB/EECS-2008-162 of Electrical Engineering and computer Sciences, Dec. 17, 2008, 109 Pages.

* cited by examiner

INFORMATION PACKAGES FOR APPLICATION $A_1$

INFORMATION PACKAGE FOR FUNCTION $F_1$

- DESCRIPTION INFORMATION
    - A NATURAL LANG. DESCRIPTION $d$ OF THE FUNCTION $F_1$
    - AN IDENTIFICATION OF THE HANDLER FUNCTION $h(s_1, s_2, \ldots s_m)$

- AN EXTENDED SET OF TEMPLATES
    - A SET OF SEED TEMPLATES
    - A SET OF ADDED TEMPLATES PROVIDED BY THE CROWDSOURCING SYSTEM
    - A SET OF ADDED TEMPLATES PROVIDED BY THE PARAPHRASING SYSTEM

- IDENTIFICATION OF ONE OR MORE GRAMMARS ($g_1, \ldots g_k$) USED TO PROCESS SLOT INFORMATION

- OPTIONAL OTHER INFORMATION

INFORMATION PACKAGE FOR FUNCTION $F_2$

INFORMATION PACKAGE FOR FUNCTION $F_3$

⋮

INFORMATION PACKAGES FOR APPLICATION $A_2$

FACILITATING DEVELOPMENT OF A SPOKEN NATURAL LANGUAGE INTERFACE

BACKGROUND

A developer who wishes to develop a spoken natural language (SNL) interface for his or her application currently faces a daunting task. For instance, to build an SNL interface from "scratch," a developer may be expected to perform the complex tasks of: defining commands for interacting with the application; selecting appropriate types of models for recognizing the commands; selecting appropriate examples and features for use in the training the models; tuning the models to provide suitable performance, and so on. These tasks are typically performed by engineers and scientists who have significant theoretical knowledge and experience in the field of linguistics and computer science. The great majority of application developers may lack such knowledge and skills.

Some platforms do exist for assisting a developer in adding relatively simple voice recognition capabilities to some applications. However, these platforms have a number of limitations. For example, some platforms place restrictions on the commands that can be used to interact with the voice recognition functionality. In addition, or alternatively, some platforms place limitations on the types of applications that may use the voice recognition functionality. The above drawbacks are cited by way of example, not limitation.

SUMMARY

A development system is described herein that facilitates development of a spoken natural language (SNL) interface. In operation, the development system receives a set of seed templates from a developer. Each seed template provides a command phrasing for use in invoking a function performed by a program, when spoken by an end user. The development system can then rely, in online fashion, on one or more development resources to provide a set of added templates, which are related to the seed templates. Illustrative development resources include a crowdsourcing system and a paraphrasing system. The set of seed templates and the set of added templates are referred to herein as an extended set of templates.

A generation system then generates one or more models based on the extended set of templates. Without limitation, the models may include a statistical language model (for use by a speech recognition engine) and a vector space model (for use by an intent determination engine). In a real time phase of operation, a user device may use the models to interpret commands spoken by user, and to invoke corresponding functions provided by an application.

Overall, the above-described functionality enables a developer to provide an SNL interface by simply supplying high-level information via an easy-to-use and easy-to-understand tool interface. The developer need not possess advanced knowledge or skills in the field of theoretical linguistics to use the functionality.

The above-described functionality can be manifested in various types of systems, components, methods, computer readable storage media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 shows a summary of information that can be collected using the development system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of an environment for developing a spoken natural language interface. Section B provides additional details regarding a development system that may be used in the environment. Section C provides additional details regarding a generation system that can be used in the environment. Section D provides additional details regarding an end user device that may be used in the environment. And Section E describes illustrative computing functionality that can be used to implement any aspect of the features described in foregoing sections.

Figure 13:
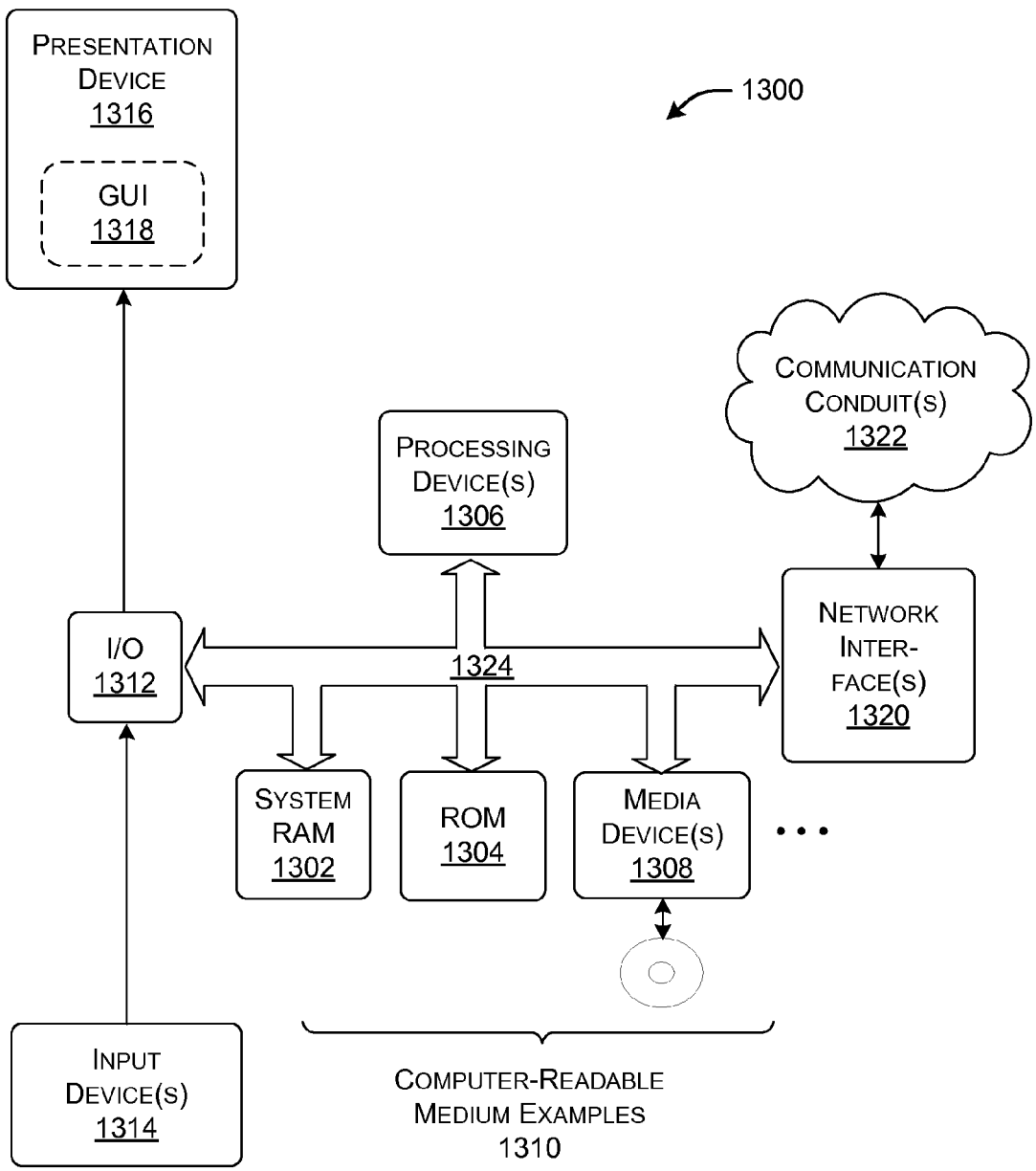
FIG. 13 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 13, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

Figure 1:
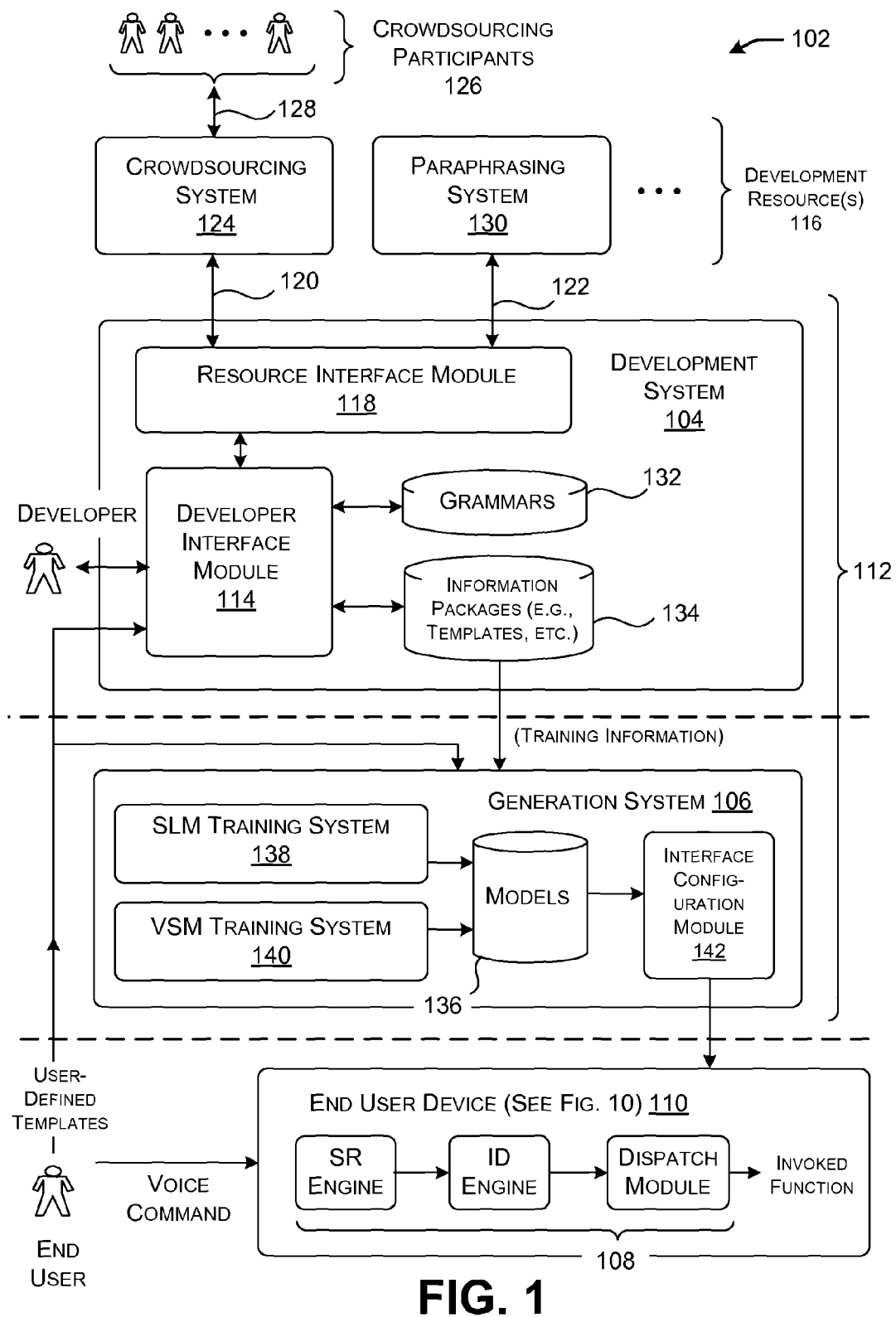
FIG. 1 shows an illustrative environment for developing and using a spoken natural language (SNL) interface. The environment includes a development system, a generation system, and a representative user device operated by an end user.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Overview of the Environment FIG. 1 shows an illustrative environment 102 for developing and using a spoken natural language (SNL) interface. The environment 102 includes a development system 104, a generation system 106, and an SNL interface 108 provided by a representative end user device ("user device") 110. By way of introduction, the development system 104 produces information which defines the configuration of the SNL interface 108. The generation system 106 uses the information provided by the development system 104 to generate one or more speech processing models. (Note that the development system 104 and the generation system 106 can be collectively referred to as a development framework 112.) The user device 110 applies the models provided by the generation system 106 to configure its SNL interface 108. Thereafter, the SNL interface 108 can use the models to interpret commands spoken by the end user and to invoke functions associated with those commands.

The environment 102 can implement the development system 104, the generation system 106, and the SNL interface 108 using any combination of physical systems. Further, the functionality provided by the environment 102 can be provided at any location or combination of locations. Further, the functionality may be controlled by any entity or combination of entities. Without limitation, for instance, the development system 104 may be implemented by one or more computer devices, such as a personal computer, a laptop computer, a tablet computer, etc. In another case, the development system 104 may be implemented by a remote service, e.g., by a remote server. In another case, the functionality associated with the development system 104 may be distributed between local computer functionality and remote computer functionality.

A person who interacts with the development system 104 is referred to as a developer herein. In one case, the developer may interact with the development system 104 to define an SNL interface 108 for an application that is being produced at the same time as the SNL interface 108. In another case, the developer may produce the SNL interface 108 for an application that is already written and available in the marketplace. In other cases, the developer can produce the SNL interface 108 for use in conjunction with two or more applications. The application itself can perform any function or combination of functions. In one case, the application is primarily intended for use on a handheld device, such a smartphone. In another case, the application may be intended for primary use on a game-playing platform, a personal computer, or some other traditionally stationary system.

In one implementation, the generation system 106 is implemented by the user device 110. In another case, the generation system 106 is implemented by the same physical system that implements the development system 104. In another case, the generation system 106 is implemented by a physical system that is separate from the user device 110 and whatever system implements the development system 104.

The user device 110 itself can be implemented in any manner. For instance, it may represent a personal computer, a computer workstation, a game-playing platform, an "intelligent" appliance of any type, a set-top box device, a laptop computer, a tablet computer, a media-playing device, a smartphone, an electronic book reader device, and so on.

This Section will provide an overview of the environment 102. Section B provides further details regarding the development system 104. Section C provides further details regarding the generation system 106. And Section D provides further details regarding the use of the SNL interface 108 by the end user device 110.

Figure 3:
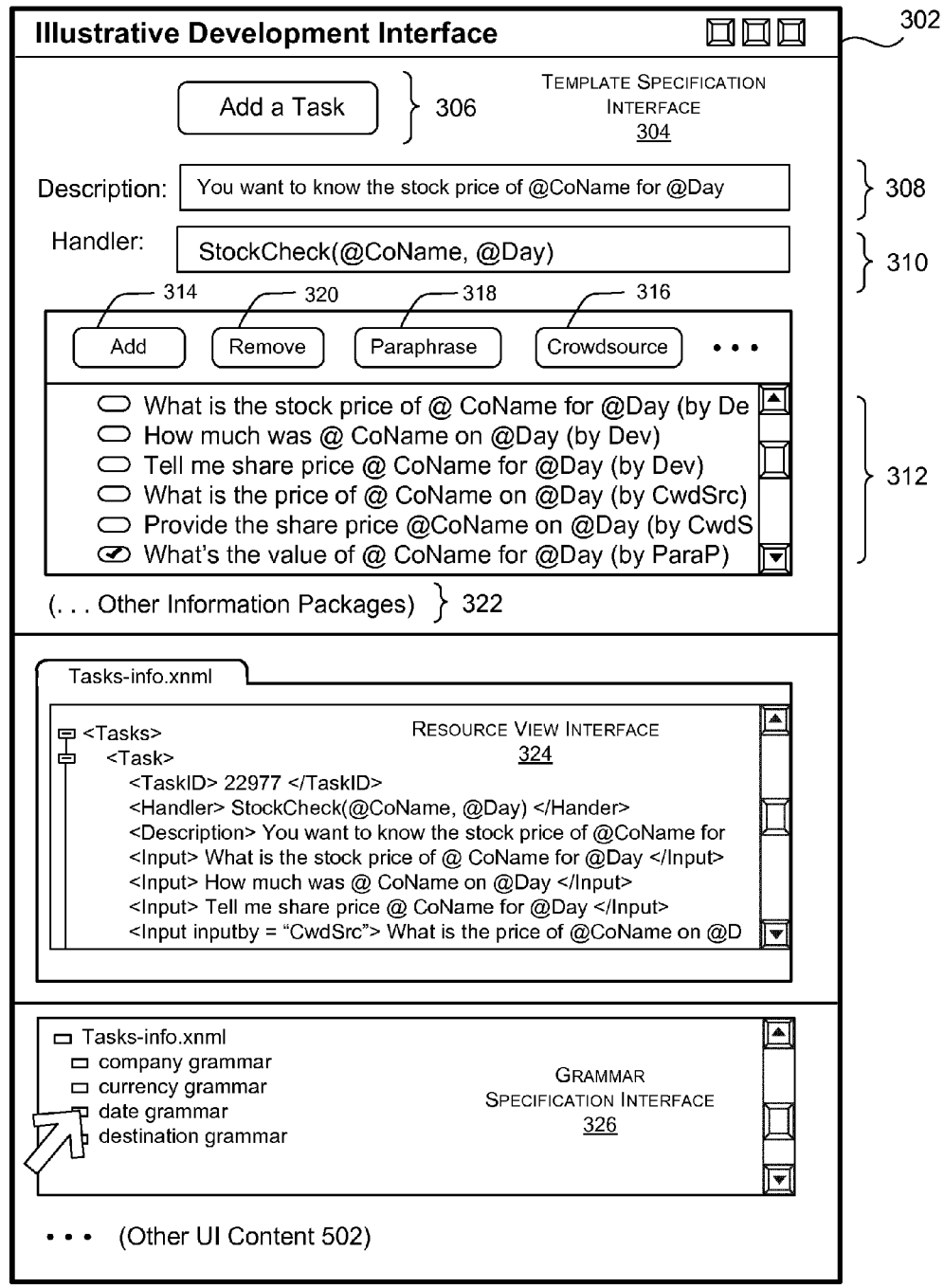
FIG. 3 shows an illustrative development interface for use by the development system of FIG. 1.

Starting with the development system 104, this functionality includes a developer interface module 114, which, in turn, provides a development interface. FIG. 3 (to be described below) provides an example of a development interface. In brief, a developer may interact with the developer interface module 114 to supply high-level information that defines the SNL interface 108 to be created. That information may include a set of seed templates, identified grammars, etc.

More specifically, each seed template provides a possible command phrasing by which an end user may invoke a particular function provided by an application. For example, assume that the function returns the price of a particular product. One seed template may correspond to the command phrasing, "Tell me the price of @product." Another seed template may correspond to "What is the cost of @product," and so on. The token "@product" corresponds to a slot variable within the command phrasings. In actual use, an end user will provide slot information in place of the slot variable when providing a command, such as by requesting "Tell me the price of [crude oil]."

A grammar provides information that is used to process slot information. For example, a grammar may provide rules for interpreting slot information associated with a particular type of slot. For instance, assume that a slot provides numeric temperature information. A grammar associated with this slot may provide rules for use in interpreting the temperature information that appears in this slot. The grammar may also define a canonical way of expressing the temperature information once it is recognized, such as by specifying that the temperature is to be rounded to the nearest integer value, and/or that the temperature is to be expressed in Fahrenheit, rather than Celsius. In one case, the grammars may be expressed in deterministic fashion, e.g., as context free grammars (CFGs).

The developer interface module 114 uses one or more development resources 116 to provide a set of added templates. Each added template provides another command phrasing that can be used to invoke the function under consideration. The developer interface module 114 can interact with the development resources 116 via a resource interface module 118. Further, any development resource may be local or remote with respect to the development system 104. For example, the development system 104 may represent a computer device which interacts with a development resource via a wide area network, such as the internet. The links 120 and 122 represent any type of communication mechanisms that link the development system 104 and the development resources 116.

The development system 104 may interact with the development resources 116 in an online fashion. This means that the developer may receive added templates from the development resources 116 soon after instructing the development resources 116 to provide the added templates. Further, the development system 104 provides an integrated command and control interface for interacting with the various development resources 116.

One development resource corresponds to a crowdsourcing system 124. The crowdsourcing system 124 invites a group of crowdsourcing participants 126 to provide added templates. The crowdsourcing system 124 then collects the added templates from the crowdsourcing participants 126, and forwards that information to the development system 104. The crowdsourcing system 124 can interact with the crowdsourcing participants 126 via any communication mechanism 128, such as a wide area network (e.g., the Internet).

Another development resource corresponds to a paraphrasing system 130. The paraphrasing system 130 can use machine translation technology to transform one or more seed templates into one or more added templates that are expressed in the same language as the seed templates. In one case, the paraphrasing system 130 can use a statistical model to perform the translation. In another application, the paraphrasing system 130 can convert the set of seed templates into another natural language (e.g., by converting English templates into Spanish templates); this scenario enables the development system 104 to localize the SNL interface 108 into a different language.

The crowdsourcing system 124 and the paraphrasing system 130 are cited by way of example, not limitation. Other implementations of the development system 104 can rely on additional development resources. The development resources 116 may be administered by any entities or combination of entities. For example, another development resource can use a natural language data mining process that accepts the seed templates as input. It then finds linguistic content (e.g., phrases, sentences, etc.) from any information source(s) that is related to the input. The information source(s) can correspond to the Web, a social media system, etc.

A data store 132 may store a library of grammars. Another data store 134 may store the information that defines the SNL interface 108 being created. That information may include a set of seed templates, a set of added templates generated by the development resources 116, information that specifies one or more grammars for use in processing slot information, and so on.

The generation system 106 receives the information stored in the data store 134. Based thereon, the interface generation system 106 can produce various speech processing models and store those models in a data store 136. For example, the generation system 106 can use a statistical language model (SLM) training system 138 to produce a statistical language model (SLM). The generation system 106 can use a vector space model (VSM) training system 140 to produce a vector space model (VSM). An interface configuration module 142 supplies the models provided in the data store 136 to the SNL interface 108, thereby configuring the SNL interface 108.

Figure 10:
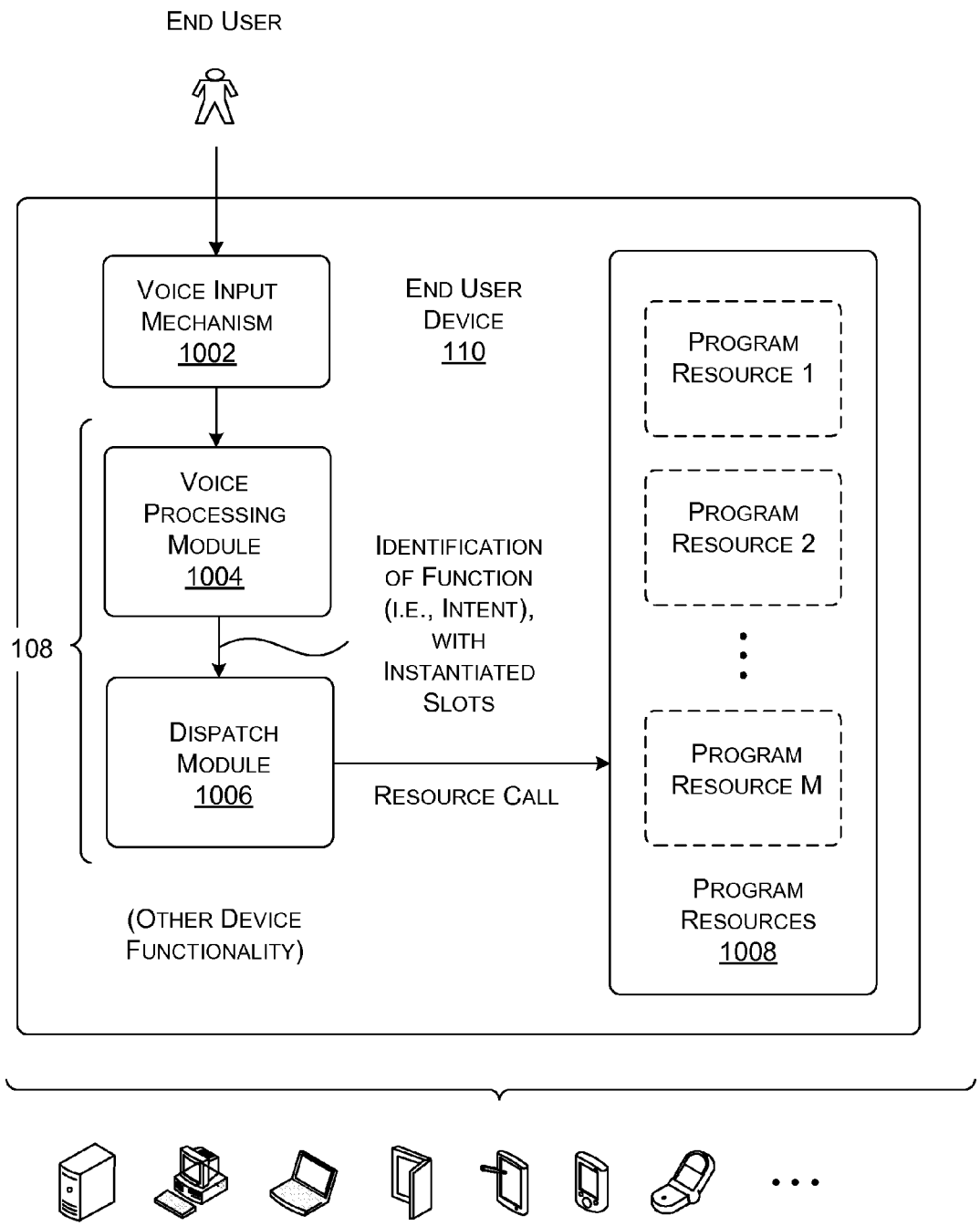
FIG. 10 shows one implementation of the representative end user device shown in FIG. 1.
Figure 11:
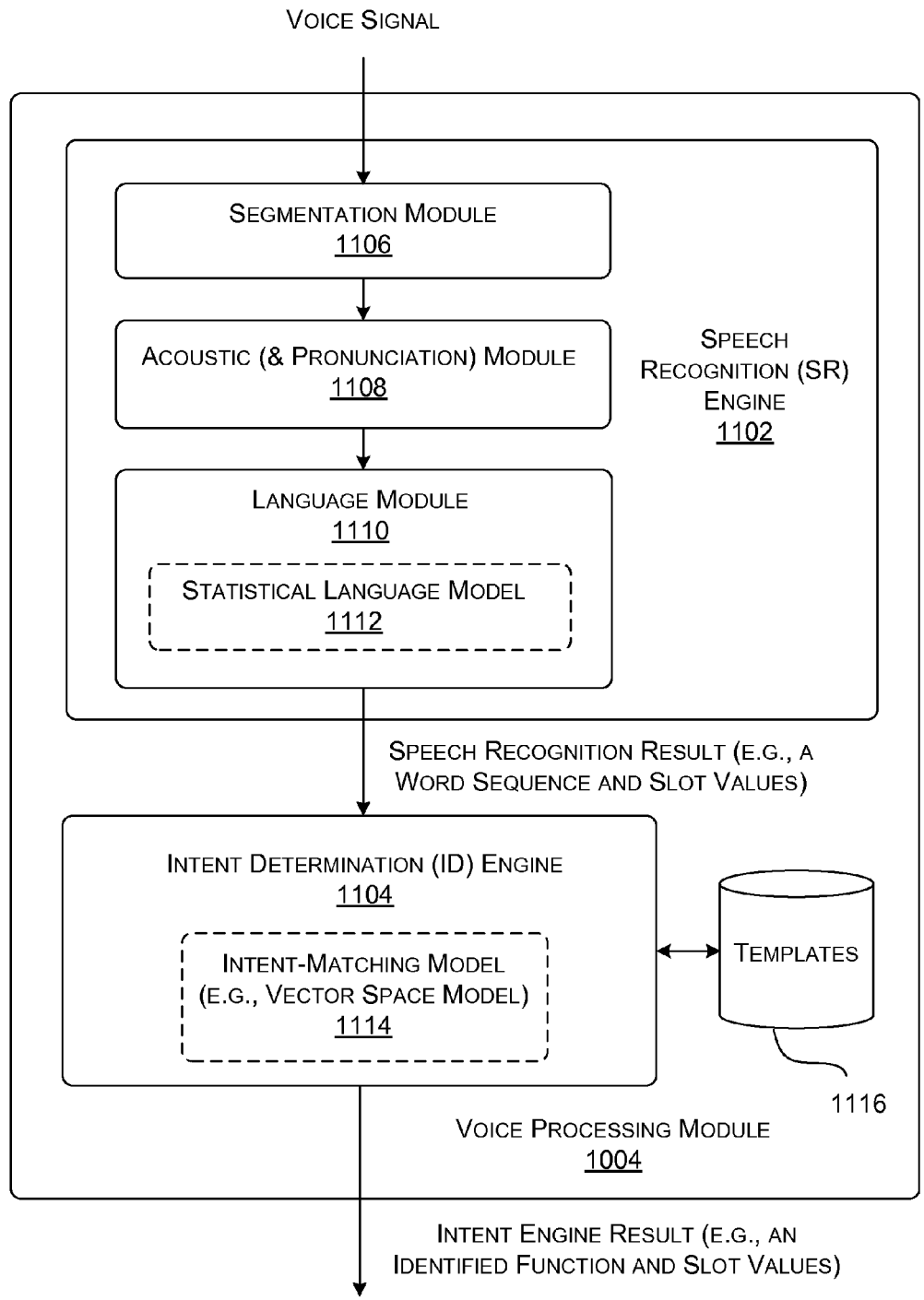
FIG. 11 shows one implementation of a voice processing module that may be used in the user device of FIG. 10.

More specifically, the SNL interface 108 may include a speech recognition (SR) engine for receiving a language model, such as the statistical language model generated by the SLM training system 138. The SNL interface 108 can also include an intent determination (ID) engine for receiving an intent-determination model, such as the vector space mode provided by the VSM training system 140. FIGS. 10 and 11 (described in Section D) provide additional details regarding the composition of the SNL interface 108.

In use, the user device 110 can convert a user's spoken command into a voice signal. The speech recognition engine can use the statistical language model to determine the most likely sequence of words that is associated with the voice signal. In one implementation, the speech recognition engine can also identify any slots and associated slot values in the sequence of words (if any). The intent determination engine can use the vector space model to map the sequence of words (provided by the speech recognition engine) into the most likely meaning of user's spoken command. In one implementation, the intent determination engine performs this task by finding the template that most closely matches the sequence of words identified by the speech recognition engine. A dispatch module then invokes the function associated with the identified template.

Figure 2:
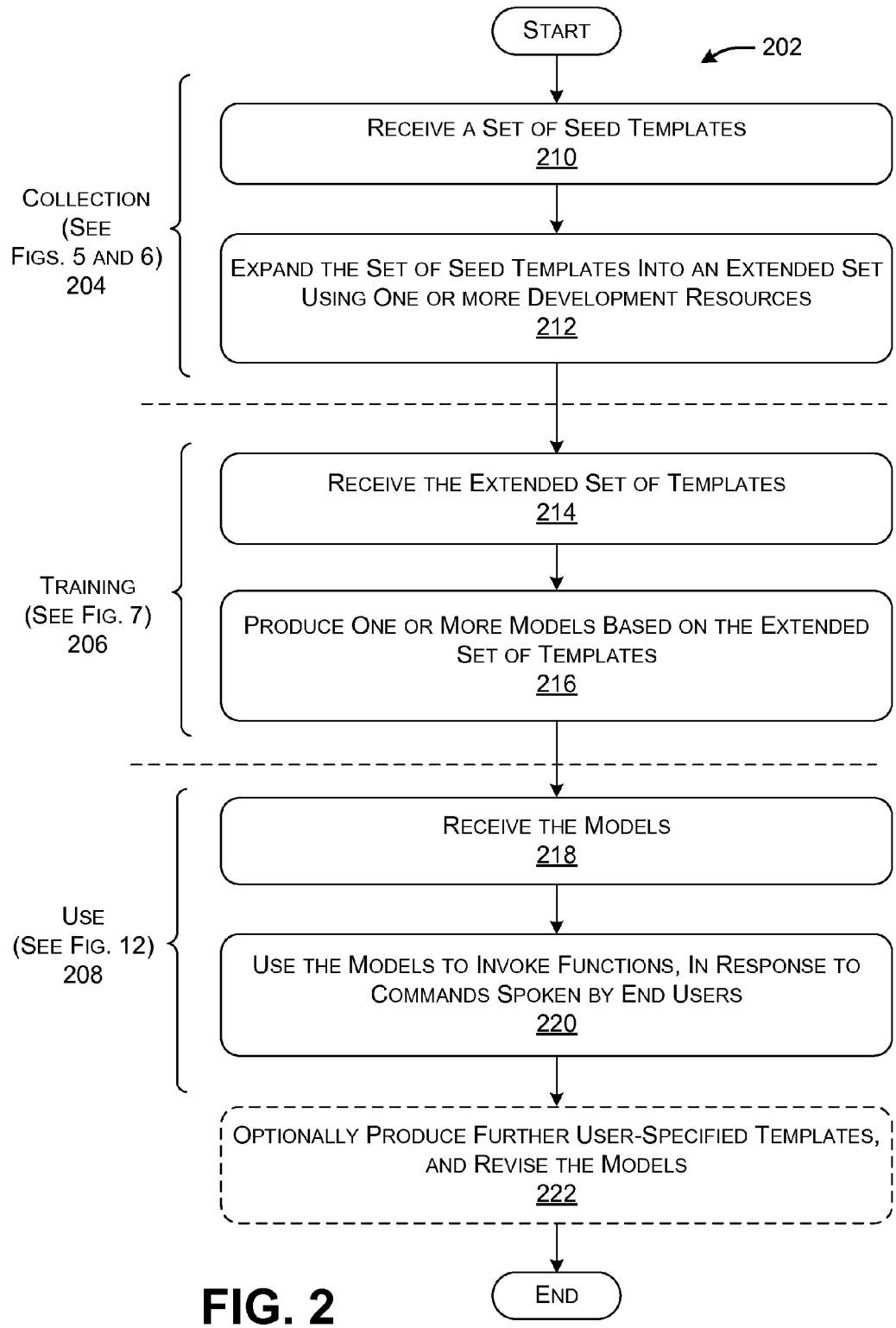
FIG. 2 is a procedure which provides an overview of one manner of operation of the environment of FIG. 1.

FIG. 2 is a procedure 202 which provides an overview of one manner of operation of the environment 102 of FIG. 1. The procedure 202 includes an information collection phase 204 performed by the development system 104, a training phase 206 performed by the generation system 106, and a use phase 208 performed by the user device 110.

In block 210, the development system 104 receives a set of seed templates from the developer. In block 212, the development system 104 generates one or more added templates using the development resources 116. The set of seed examples and the set of added examples together correspond to an extended set of templates, according to the terminology used herein. Further, the term "set" comprises any number of entries, including zero, one or more entries.

In block 214, the generation system 106 receives the extended set of templates, together with optional other information, such as an identification of one or more grammars for use in processing the slot information. In block 216, the generation system 106 produces one or more models based on the information that is received in block 214.

In block 218, the user device 110 receives the models. In block 220, the user device 110 uses the models to invoke resources in response to commands spoken by end users. In block 222, the end user can produce one or more user-defined templates. The generation system 106 can receive the added user-defined templates and then update the models based on these user-defined templates, together with the originally-received templates. This operation allows an end user to modify the models in the SNL interface 108 so they are more responsive to the speech-related habits of the user. The end user can also interact with the developer interface module 114 in the same manner as the developer, which allows the end user to interact with the development resources 116 to produce added templates based on user-defined templates.

B. Specifying the SNL Interface

FIG. 3 shows an illustrative development interface 302 that may be produced by the developer interface module 114 shown in FIG. 1. As stated above, the developer may interact with the development interface 302 to provide high-level information that defines the SNL interface 108, with respect to one or more functions provided by one or more applications. The development interface 302 represents just one way of collecting the information; other implementations can vary any aspect of the functionality shown in FIG. 3 in any manner, e.g., by providing a different selection of the interface features, a different arrangement of interface features, a different appearance of the interface features, and so on.

A template specification interface 304 provides a mechanism by which a developer can produce templates associated with a particular function under consideration. The developer can initiate this process by activating an "Add a Task" interface feature 306. This action populates the template specification interface 304 with a set of input boxes for use in describing the function under consideration. For instance, a "Description" interface feature 308 invites the developer to provide a natural language description associated with the function. The particular function in this case determines the price of a specified company's stock on a specified day. One appropriate description may therefore read, "You want to know the stock price of @CoName for @Day," where "@CoName" is a slot token corresponding to the name of the company and "@Day" is a slot token corresponding to the day for which the price is requested. A "Handler" interface feature 310 invites the developer to specify a handler function that will activate the identified function—in this case the representative StockCheck(@CoName, @Day) handler function. In other words, the user device 110 can execute the StockCheck(@CoName, @Day) function, together with values for @CoName and @Day, to invoke the desired price-checking operation.

An input box 312 lists various command phrasings that the end user can speak to invoke the above-described function. Each command phrasing constitutes a template. The developer may begin by specifying one or more seed templates. In this example, the developer has inputted at least the top three templates shown in the input box 312, as indicated by the parenthetical "by Dev" label at the end of each of these templates. More specifically, in one implementation, the developer can activate an "Add" interface feature 314 to introduce each new seed template.

The developer can then interact with the development resources 116 to provide added templates. For example, the developer can activate a "Crowdsource" interface feature 316 to request the crowdsourcing system 124 to generate one or more added templates. Alternatively, or in addition, the developer can interact with the "Paraphrase" interface feature 318 to request the paraphrasing system 130 to provide one or more added templates. The input box 312 lists at least two added templates generated by the crowdsourcing system 124, as indicated by the parenthetical "by CwdSrc" label at the end of these two templates. The input box 312 lists at least one added template generated by the paraphrasing system 130, as indicated by the parenthetical "by Parphr" label at the end of this template. In actual practice, a developer may create a larger collection of seed templates and added templates compared to the collection shown in FIG. 3.

The developer can also edit any of the templates in any manner. For example, the developer can activate a "Remove" interface feature 320 to delete any template for any reason, e.g., because that template is a duplicate or near-duplicate version of another template. Or the developer can change the text of any template in any way for any reason. The editing process yields a final extended set of templates.

The parenthetical note "Other Information Packages" 322 indicates that the developer can enter the same kind of information described above for another function, e.g., by activating the "Add a Task" interface feature 306. As such, the template specification interface 304 can include multiple sets of the input boxes described above (but not shown in FIG. 3), each corresponding to a different function.

A resource view interface 324 expresses the information described above in a more formal manner, in this case as a markup language document named "Task-info.xnml." The generation system 106 can directly operate on the information in this document to produce the models for use by the SNL interface 108. The generation system 106 may ultimately express the models as a binary executable file.

A grammar specification interface 326 specifies representative grammars that are associated with the document Task-info.xnml. For example, the grammars may include a first grammar for processing company information specified in the company-related slot (e.g., @CoName), and a second grammar for processing the day information specified in the date-related slot (e.g., @Day), etc. A developer may modify this list of grammars in any manner, for example, by adding one or more new grammars, by removing one or more existing grammars, and/or by swapping out one or more existing grammars with updated grammars of the same type.

FIG. 4 summarizes the information that may be collected by the development interface 302 shown in FIG. 3. In one implementation, the development system 104 may produce an information package for each function under consideration. An information package may specify: description information (including a natural language description of the function and an identification of the handler function); an extended set of templates (including a set of seed templates and a set of added templates); an identification of one or more grammars; and optional other information.

A developer may produce a collection of information packages for a subset of functions in an application under development (or an application that already exists). Further note that some applications may share one or more common functions.

Figure 5:
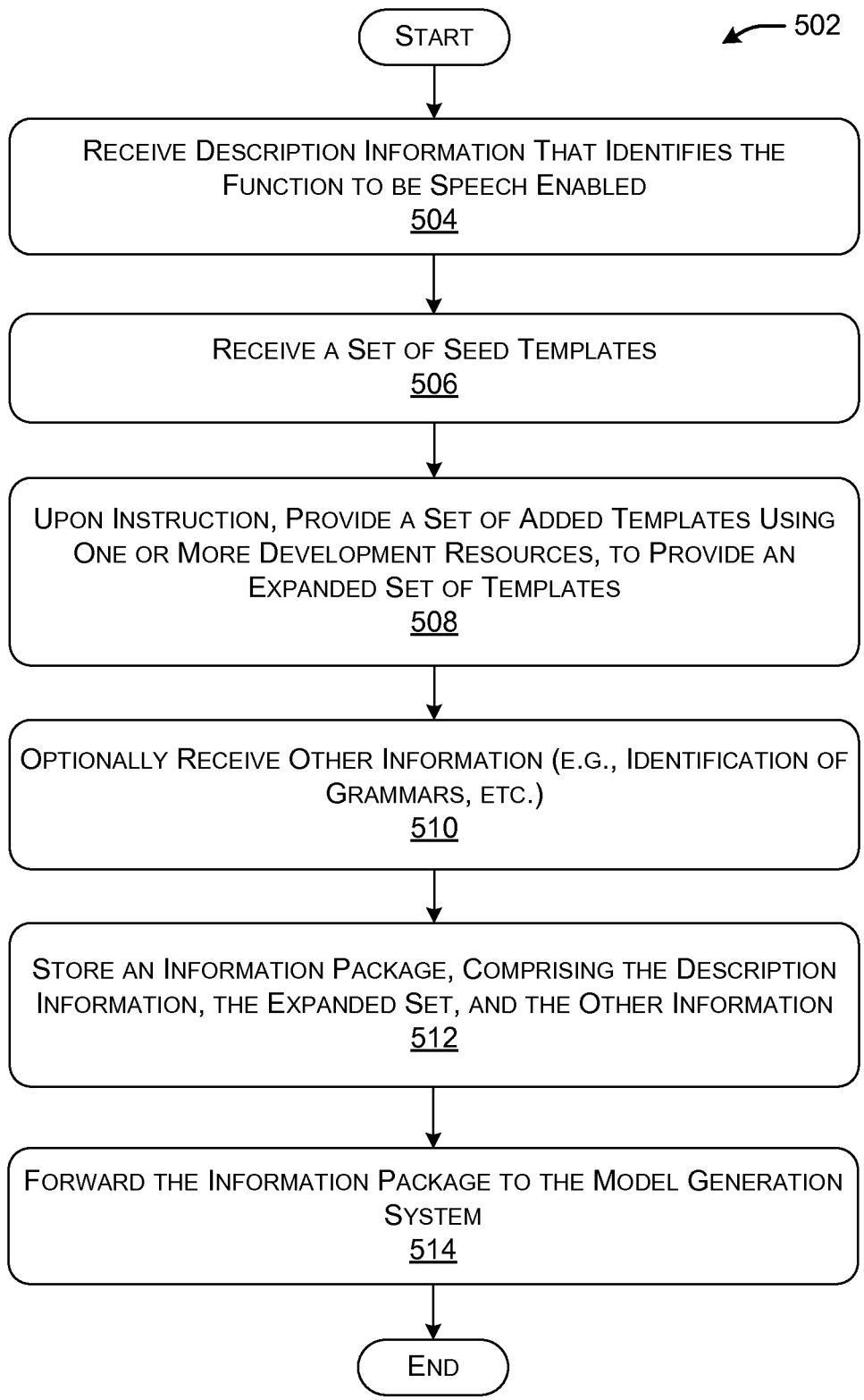
FIG. 5 is a procedure which provides an overview of one manner of operation of the development system of FIG. 1.

FIG. 5 is a procedure 502 which provides an overview of one manner of operation of the development system 104 of FIG. 1. In block 504, the development system 104 receives description information which identifies a function under consideration. In block 506, the development system 104 receives a set of seed templates. In block 508, the development system 104 provides a set of added templates using one or more development resources 116. In block 510, the development system 104 can optionally receive other information, such as an identification of one or more grammars, etc. In block 512, the development system 104 stores an information package which includes all of the information items collected in the preceding blocks. In block 514, the development system 104 can forward the information package (or plural such packages) to the generation system 106. For example, the development system 104 can forward this information to the user device 110 which may implement the generation system 106; the transfer may be conducted using a wide area network, such as the Internet.

Figure 6:
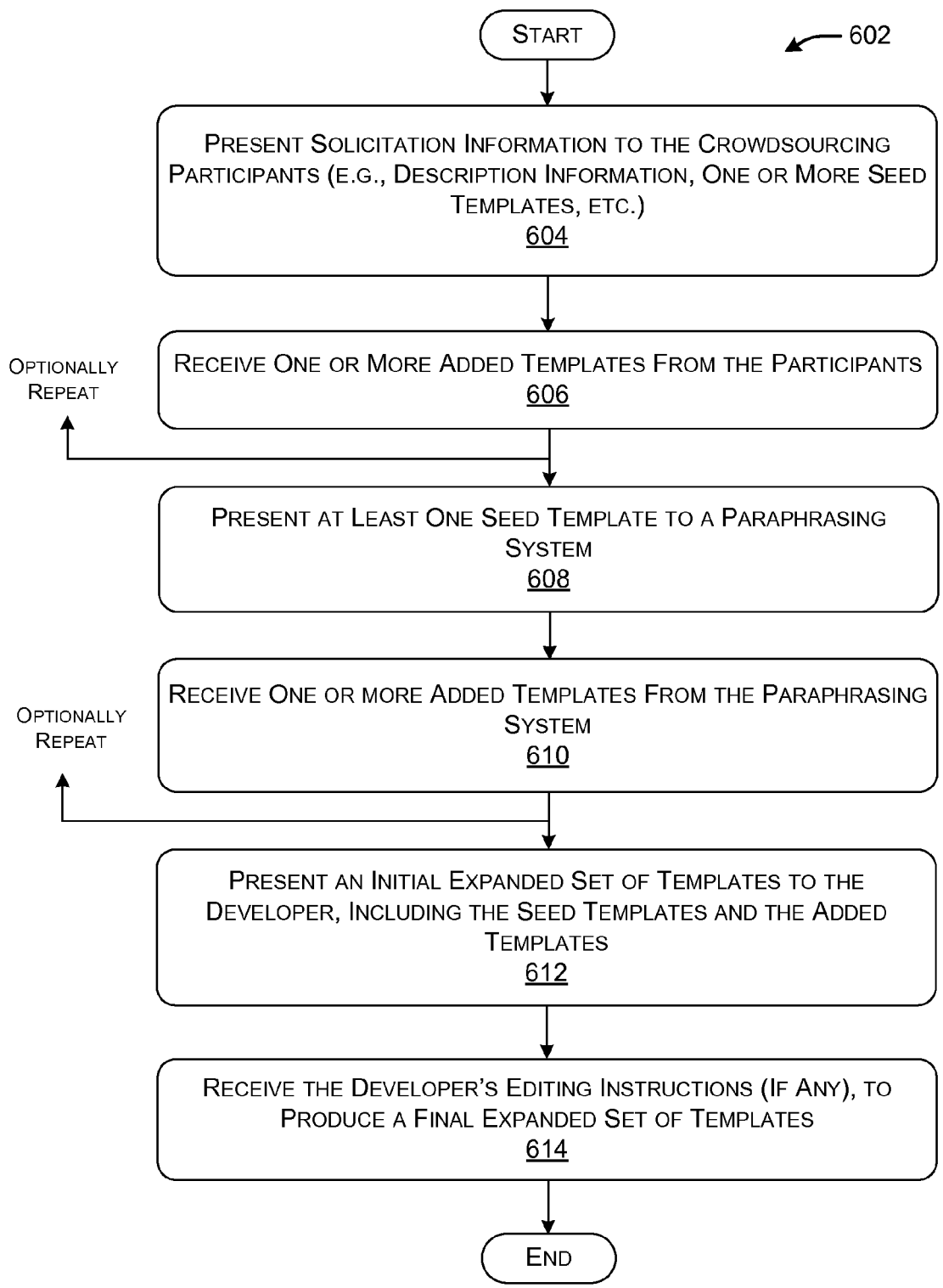
FIG. 6 is a procedure that provides a more specific description of one manner of operation of the development system of FIG. 1, compared to FIG. 5. In this example, the development system relies on a crowdsourcing system and a paraphrasing system to provide added templates.

FIG. 6 is a procedure 602 that provides a more specific description of one illustrative manner of operation of the development system 104 of FIG. 1. In this example, the development system 104 relies on the crowdsourcing system 124 and the paraphrasing system 130 to provide added templates.

In block 604, the development system 104 forwards solicitation information to the crowdsourcing system 124; the crowdsourcing system 124, in turn, presents the solicitation information to each of the crowdsourcing participants 126. The solicitation information generally describes the crowdsourcing task that is presented to each crowdsourcing participant. This information may include any of the information items in an information package, such as the natural language description of the function and one or more seed templates. To make the examples easier to understand, the development system 104 can replace each slot with a representative value, such as by formulating the third seed template shown in FIG. 3 as "Tell me the share price of [Facebook] for [today]."

The development system 104 and/or the crowdsourcing system 124 can also provide instructions which guide each participant in formulating an added template. For example, the crowdsourcing system 124 can asking the participant to generate an added template that: (1) comprises a single phrase or sentence; (2) includes all slot values that appear in the seed templates; (3) does not change the meaning of the natural language description and the seed templates; and (4) corresponds to a natural manner of speaking that a user would use to interact with an application. The description information and seed templates can also be chosen so as to solicit a desired variety of added templates. For example, the development system 104 may choose at least one seed example that adopts an imperative command phrasing, and at least one seed example that poses the command as a question; this may prompt the crowdsourcing participants 126 to produce both varieties of templates. In block 606, the development system 104 receives one or more added templates from the crowdsourcing system 124.

In block 608, the development system 104 can provide one or more seed templates to the paraphrasing system 130. For example, the development system 104 can submit a set of seed templates to the paraphrasing system 130 in serial fashion, one after another. As noted above, the paraphrasing system 130 can use machine translation technology to translate each seed template into one or more added templates. Each added template expresses the same meaning as its counterpart seed template, but in a different form. One publically available system for performing this task is the Microsoft® Contextual Thesaurus (MCT) provided by Microsoft® Corporation of Redmond, Wash. This kind of paraphrasing system 130 can be trained based on a corpus of phrase mappings, each establishing a nexus between an input phrase and an output phrase expressed in the same natural language. In block 610, the development system 104 receives one or more added templates produced by the paraphrasing system 130.

In block 612, the development system 104 can present an initial list of templates, including an initial set of seed templates and an initial set of added templates collected via the preceding blocks. In block 614, the development system 104 can allow the developer to edit this initial list in any way described above, to thereby produce a final extended set of templates. The development system 104 can also perform automated editing upon request, such as by removing duplicate templates, templates that lack a requisite number of slots, and/or templates that are deficient in other regards.

C. Generating the SNL Interface

Figure 7:
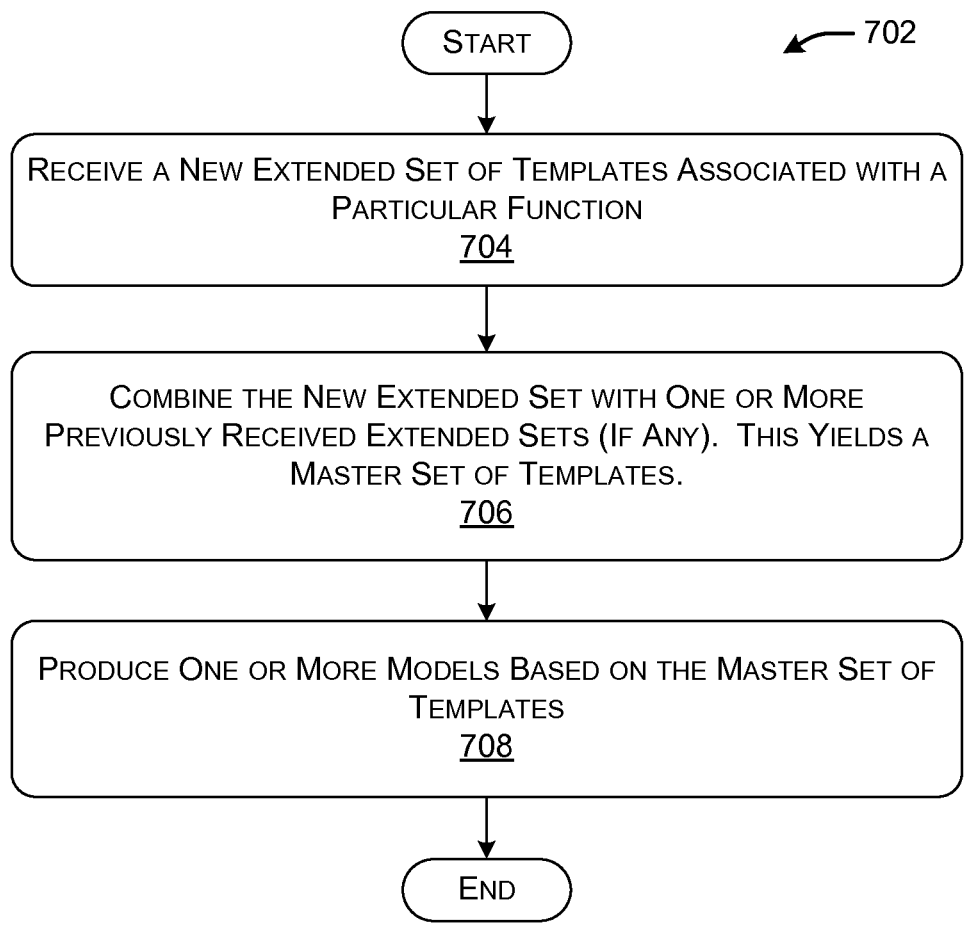
FIG. 7 is a procedure which describes one manner of operation of the generation system of FIG. 1.

FIG. 7 is a procedure 702 which describes one manner of operation of the generation system 106 of FIG. 1. In block 704, the generation system 106 receives an extended set of templates associated with a particular function. In block 706, the generation system 106 optionally combines the received extended set of templates with one or more previously-provided extended sets of templates (if any). For example, in block 704, the generation system 106 can receive an extended set for a function $F_1$. In block 706, the interface generation system 106 can combine those templates with the templates generated for functions $F_2, F_3, \ldots F_n$. This produces a master set of templates. In block 708, the generation system 106 produces one or more models based on the master set of templates. In other words, the master set of templates constitutes a training corpus for use in producing the models.

More specifically, the generation system 106 may produce any type of language model for use in a speech recognition engine, and any type of intent-matching model for use in an intent determination engine. This section will provide illustrative details regarding possible implementations of the language model and the intent-matching model.

Figure 8:
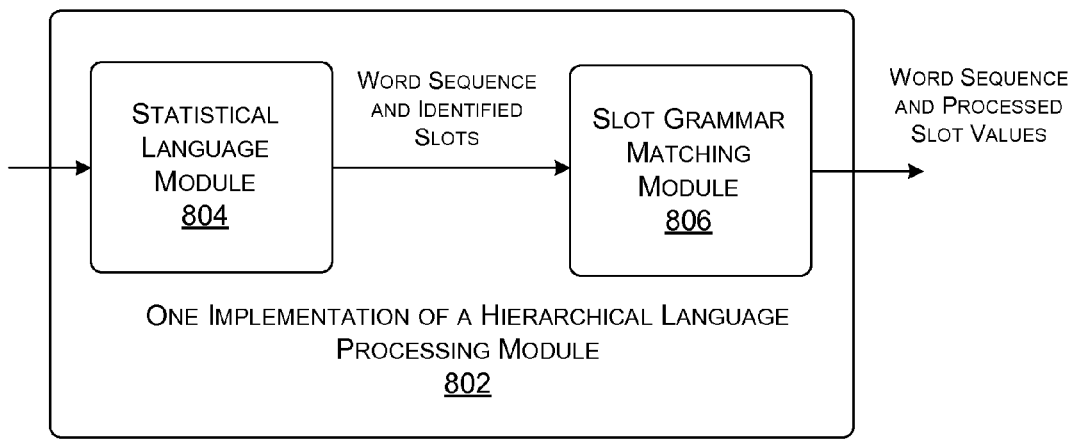
FIG. 8 shows one implementation of a hierarchical language processing module that can be provided using the generation system of FIG. 1.

To begin with, FIG. 8 shows a hierarchical language processing module 802 that includes a statistical language module 804 together with a slot grammar matching module 806. In one implementation, the SLM training system 138 (of FIG. 1) may produce one or more n-gram models for use by the statistical language module 804, based on a training corpus that corresponds to at least the master set of templates. In one case, the slots in the templates may be expressed as slot tokens for training purposes, rather than instantiated slot values. For example, one template may read, "What is the stock price of @CoName for @Day, rather than an instantiated version, "What is the stock price of Facebook for today."

The statistical language module 804 receives a voice signal corresponding to a command spoken by an end user. In response, the statistical language module 804 produces a sequence of words that is determined to most likely represent the words in the command. The output result also identifies the presence of one or more slots in the sequence, if, in fact, the command is determined to include one or more slots. More specifically, the statistical language module 804 can use statistical techniques to predict the occurrence of a slot token in a string in the same manner that it predicts the occurrence of a word.

The slot grammar matching module 806 then uses one or more grammars to interpret the slot information that is associated with the identified slot(s). For example, assume that the statistical language module 804 determines that a sequence includes a slot for receiving a company name (associated with the slot token @CoName) and a slot for receiving a specified day (associated with the slot token @Day). The slot grammar matching module 806 can consult a pre-generated table of company names to interpret the slot information that is associated with the @CoName slot. Similarly, the slot grammar matching module 806 can consult deterministic interpretation rules (e.g., a context free grammar) to interpret the slot information that is associated with the @Day slot. The slot grammar matching module 806 can also use the identified grammars to define a canonical form in which each instance of slot information is to be expressed. For example, assume that the user speaks the company name "Acme Inc." in a command; the slot grammar matching module 806 can consult a grammar to reformulate this slot information as "Acme" or "Acme Incorporated," etc.

In one case, the statistical language module 804 can be implemented using a trigram language model by itself. That model predicts the likelihood $p_{ijk}$ of a next word $w_k$ based on the preceding two words ($w_i$ and $w_j$) in the sequence of words, that is, $p_{ijk}=P(w_k|w_i w_j)$. The value of $p_{ijk}$ can be determined by counting corresponding occurrences of words in the training corpus. Where the training corpus lacks certain words, known approximations techniques can be used to provide an estimate of the counts, e.g., based on bigram and unigram probabilities.

Figure 9:
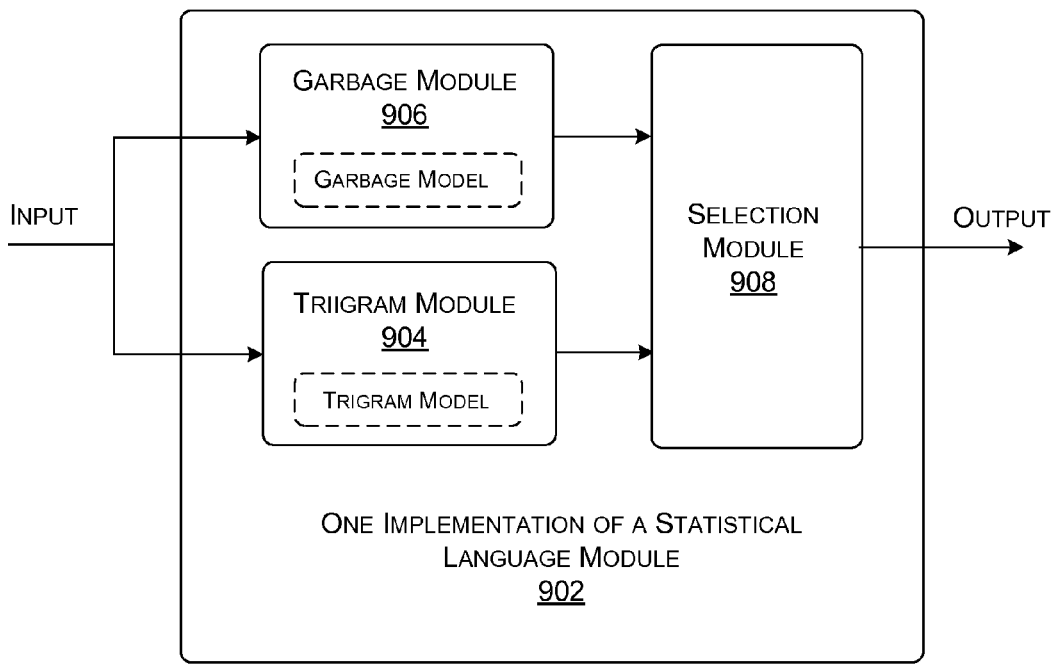
FIG. 9 shows one implementation of a statistical language module that can be used in the functionality of FIG. 8.

FIG. 9 shows another implementation of the statistical language module 804 (that is, instead of using a trigram language model by itself to implement this functionality). In this case, the statistical language module 902 includes an "in-domain" trigram module 904 that implements a trigram model (or some other n-gram model or combination of n-gram models), in combination with a garbage module 906 that implements a garbage model. The SLM training system 138 can produce the in-domain trigram model (for use by the trigram module 904) using known training techniques based on just the training corpus that corresponds to the master set of templates. The garbage model is used to identify spoken information that does not likely correspond to any intended command. The SLM training system 138 may produce the garbage model based on any "garbage" training corpus that is produced independent of the master set of templates. Furthermore, the words that are present in the master templates can be omitted from the garbage training corpus; this provision enables the statistical language module 902 to more readily distinguish between meaningful commands and unrelated "garbage" speech.

In operation, the statistical language module 902 attempts to interpret a spoken command using both the trigram and garbage modules (904 and 906), which operate in parallel. Each module will evaluate the input utterance against its n-gram model to generate an output result (representing an interpretation of the input utterance) having a confidence associated therewith. The in-domain trigram module 904 will likely produce an output result having a higher confidence than the garbage module 906 when the user utters a recognizable command in the course of interacting with an application; otherwise, the garbage module 906 may produce an output result having a higher confidence compared to the trigram module 904. Again, this is because the trigram model is trained based on the templates in the master set of templates, unlike the garbage model.

A selection module 908, which may comprise part of the SR engine itself, receives the output results generated by both the modules (904 and 906) for a particular utterance under consideration. It picks the output result associated with the higher confidence. The statistical language model 902 can ignore the utterance if the garbage module 906 produces the output result having the highest confidence, as the utterance likely corresponds to an out-of-domain utterance.

In summary, the language processing module 802 of FIG. 8 interprets the words and slot values that are likely to be present in a command spoken by an end user. But this functionality does not attempt to determine the meaning of the command as a whole. The meaning corresponds to the intent of the end user in speaking the command. In contrast, an intent determination engine (not shown) may use an intent-matching module (not shown) to determine the meaning associated with the word sequence provided by the language processing module 802 (or some other language module).

In one implementation, the intent-matching model may correspond to a vector space model. This model represents each template as a vector in a vector space. The model can assess the similarity between two templates by comparing the distance between the two vector representations of the templates in the vector space. The distance can be assessed using any distance metric, such as a cosine similarity measure. In a similar manner, the vector space model may formulate a vector representation of an input command spoken by the user. The vector space model can then find the template in the master set of templates that is "closest" to the input command in vector space. This template corresponds to the meaning or intent of the input command.

More formally stated, the vector space model can represent each template $t_i$ as a feature tuple $\lambda_i=(\lambda_{1i}, \ldots \lambda_{Ni})$, with one weight assigned to each of the N tokens in the master set of templates. The distance between template $t_i$ and template $t_j$ can be expressed as the cosine of the angle between them, that is, $(\lambda_i \cdot \lambda_j)/(\|\lambda_i\|\|\lambda_j\|)$. The VSM training system 140 (of FIG. 1) can compute the Term Frequency-Inverse Document Frequency (TF-IDF) weight $\lambda_{ij}$ of token $\tau_i$ in template j as:

$$\lambda_{ij} = f_{ij}\log\left(\frac{\text{total number of templates}}{\text{number of templates that contain } \tau_i}\right).$$

In this equation, $f_{ij}$ corresponds to the frequency of token $\tau_i$ in template j. The numerator of the equation refers to the total number of templates in the master set of templates, and the denominator refers to the number of templates in the master set which contain the token under consideration ($\tau_i$).

However, the ultimate goal in the matching procedure is to effectively discriminate between different families of templates, where each family of templates provides a set of command phrasings associated with a particular function. The goal is not to distinguish between two templates associated with the same family of templates that pertains to the same function. In other words, each family expresses the same intent to perform a particular function. For example, the template "Turn up the volume" and the template "Increase the sound" correspond to the same family because they express the same intent to increase the volume of an audio output device. The template "Retrieve [Tom's] phone number" belongs to another family. The goal is to distinguish between the volume control family and the phone number retrieval family (for instance), and not to distinguish between templates within any particular family. To address this issue, the weighting equation can be reformulated as:

$$\lambda_{ij} = f_{ij}\log\left(\frac{\text{total number of templates}}{\text{number of template families that contain } \tau_i}\right).$$

All terms of this equation are the same as the first-stated equation above, except the denominator. The denominator identifies the total number of functions which have template sets which contain the token under consideration ($\tau_i$). For example, assume that there are 30 templates in the master set that contain the word "destination," but these 30 templates are spread among only 3 templates families associated with 3 respective functions. The denominator in the first equation provided above will be 30, while the denominator in the second equation will be 3.

The particular types of models described above are cited by way of example, not limitation. The generation system 106 can generate many other types of models. In one variation, the generation system 106 can generate a Large Vocabulary Speech Recognition (LVSR) model for use by the speech recognition engine, rather than a model that uses an n-gram technique together with a garbage model. In another variation, the slot grammar matching module 806 can use a statistically-trained model to recognize slots, rather than, or in addition to, a deterministic technique. In another variation, the intent determination engine can recognize slots and analyze slot information, rather than the speech recognition engine. For example, the intent determination engine can use a Conditional Random Field (CRM) technique to identify slots in a word sequence provided by the speech recognition engine. In another variation, another type of intent-matching model can be used in the intent determination engine, rather than the above-described vector space model, such as, for example, a Latent Semantic Analysis (LSA) model, a Latent Dirichlet Allocation (LDA) model, etc. These variations are cited by way of example, not limitation.

D. Applying the SNL Interface

FIG. 10 shows one implementation of the end user device 110 shown in FIG. 1. (Note that this figure particularly shows the functionality that is relevant to the processing of voice commands, so it is not intended to represent all aspects of a user device.) The user device 110 includes a voice input mechanism 1002 for generating a voice signal in response to a command spoken by the end user. For example, in one embodiment, the voice input mechanism 1002 may correspond to one or more microphones provided on a smartphone or other kind of handheld device. A voice processing module 1004 maps the voice signal to a program function that the end user intends to invoke by speaking the command. A dispatch module 1006 then activates a program resource that is associated with the identified function. For example, the voice processing module 1004 may map the voice signal to a particular handler function, and to particular slot values which instantiate the input variables of the handler function. The dispatch module 1006 then executes the handler function to call the program resource that is associated with the handler function. The program resource that is called is one of a set of program resources 1008 associated with an application that the end user is running. In one implementation, the SNL interface 108 introduced in FIG. 1 may correspond to the voice processing module 1004 in conjunction with the dispatch module 1006.

FIG. 11 shows one implementation of the voice processing module 1004 of FIG. 10. The voice processing module 1004 includes a speech recognition engine 1102 and an intent determination engine 1104. The speech recognition engine 1102 includes a segmentation module 1106 for segmenting the voice signal produced by the voice input mechanism 1002 (of FIG. 10) and for featurizing the voice signal. An acoustic module 1108 converts the segmented and featurized voice signal into words using an acoustic model and a pronunciation model. The segmentation module 1106 and acoustic module 1108 can use known techniques to perform the above-described tasks.

A language module 1110 maps the output of the acoustic module 1108 into a sequence of words using a statistical language model 1112 or some other kind of model. For example, the language module 1110 can use the type of functionality described above with reference to FIGS. 8 and 9 to perform this task. In that particular implementation, the language module 1100 also identifies slots in the sequence of words, and interprets the slot information expressed in those slots using one or more grammars. Alternatively, as noted above, the intent determination engine 1104 can extract the slots and interpret the slot information.

The intent determination engine 1104 can use any intent-matching model 1114 to map the sequence of words (and slots) identified by the speech recognition engine 1102 into an intent. As stated above, the intent is associated with a particular function that the user intends to invoke by speaking the command. The intent-matching model 1114 can be implemented as the vector space model described above. As explained, the vector space model compares the sequence of words identified by the speech recognition engine 1102 with all of the templates in the master set of templates defined by the development system 104. It then picks out the template that most closely matches the sequence of words. The data store 1116 stores the templates in the master set of templates.

Figure 12:
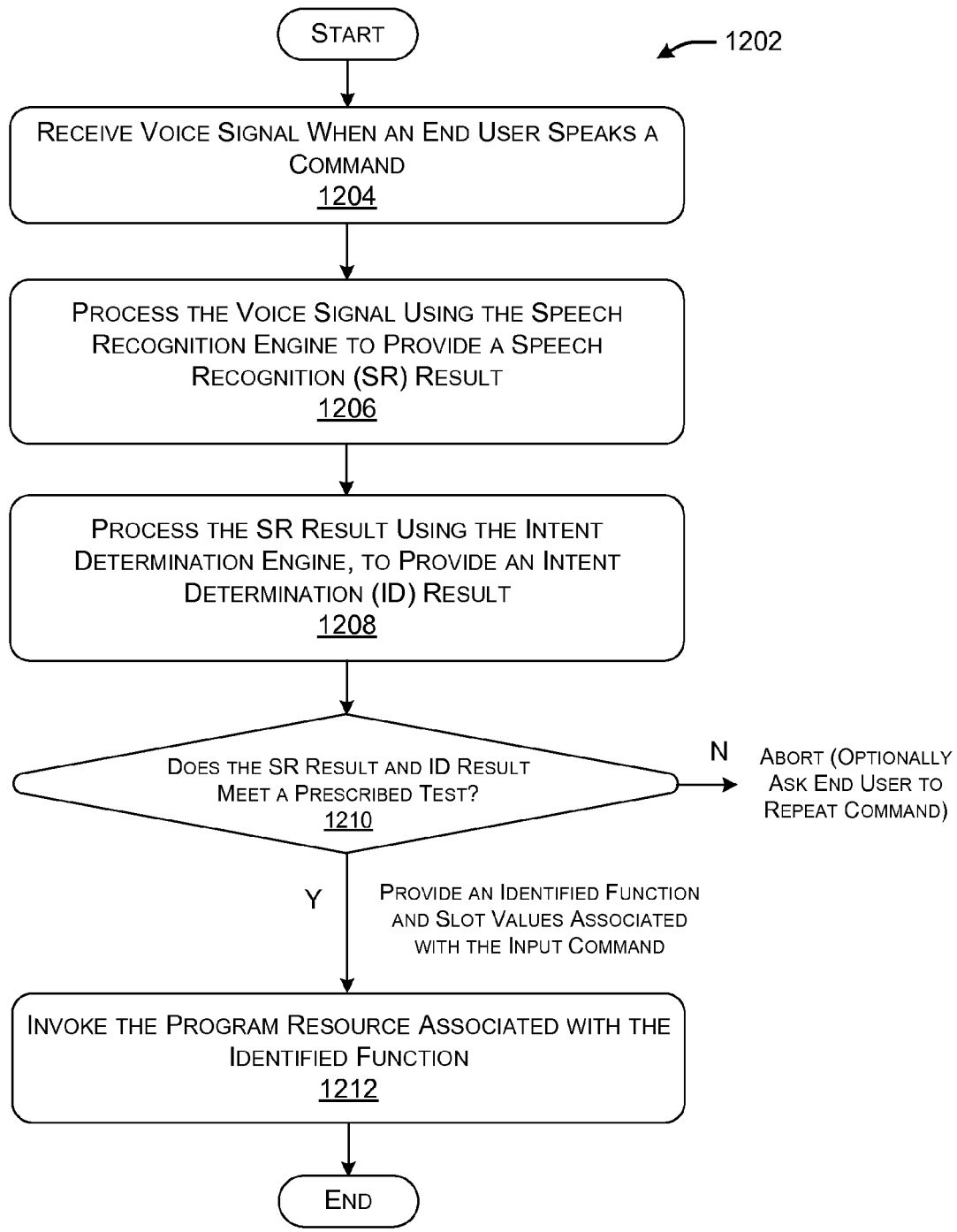
FIG. 12 is a procedure that shows one manner of operation of the user device of FIG. 10.

FIG. 12 is a procedure 1202 that shows one manner of operation of the end user device 110 of FIGS. 1, 10, and 11. In block 1204, the user device 110 receives a voice signal provided by the voice input mechanism 1002. In block 1206, the user device 110 processes the voice signal using the speech recognition engine 1102 to provide a speech recognition (SR) result, e.g., a sequence of words and slots with a probability associated therewith. In block 1208, the user device 110 processes the SR result using the intent determination engine 1104 to provide an intent determination (ID) result, e.g., an identified function (intent) and a probability associated therewith.

In block 1210, the user device 110 determines whether the SR result and the ID result satisfy a prescribed test. For example, the user device 110 can determine whether the probability values associated with the SR result and the ID result each satisfy a prescribed threshold and/or other criteria. If this test is not met, then the user device 110 can abort the recognition attempt without invoking any function. The user device 110 can also optionally invite the end user to repeat the spoken command. Alternatively, if the test is met, then, in block 1212, the user device 110 can use the dispatch module 1006 to activate a program resource associated with the identified function.

E. Representative Computing functionality

FIG. 13 sets forth illustrative computing functionality 1300 that can be used to implement any aspect of the functions described above. For example, the type of computing functionality 1300 shown in FIG. 13 can be used to implement any aspect of the development system 104, and/or any aspect of the generation system 106, and/or any aspect of the user device 110. In one case, the computing functionality 1300 may correspond to any type of computing device that includes one or more processing devices. In all cases, the computing functionality 1300 represents one or more physical and tangible processing mechanisms.

The computing functionality 1300 can include volatile and non-volatile memory, such as RAM 1302 and ROM 1304, as well as one or more processing devices 1306 (e.g., one or more CPUs, and/or one or more GPUs, etc.). The computing functionality 1300 also optionally includes various media devices 1308, such as a hard disk module, an optical disk module, and so forth. The computing functionality 1300 can perform various operations identified above when the processing device(s) 1306 executes instructions that are maintained by memory (e.g., RAM 1302, ROM 1304, or elsewhere).

More generally, instructions and other information can be stored on any computer readable medium 1310, including, but not limited to, static memory storage devices, magnetic storage devices, optical storage devices, and so on. The term computer readable medium also encompasses plural storage devices. In many cases, the computer readable medium 1310 represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1300 also includes an input/output module 1312 for receiving various inputs (via input devices 1314), and for providing various outputs (via output devices). Illustrative input devices include a keyboard device, a mouse input device, a touchscreen input device, a gesture input device, a microphone, tabletop or wall-projection input mechanisms, and so on. One particular output mechanism may include a presentation device 1316 and an associated graphical user interface (GUI) 1318. The computing functionality 1300 can also include one or more network interfaces 1320 for exchanging data with other devices via one or more communication conduits 1322. One or more communication buses 1324 communicatively couple the above-described components together.

The communication conduit(s) 1322 can be implemented in any manner, e.g., by a local area network, a wide area network (e.g., the Internet), etc., or any combination thereof. The communication conduit(s) 1322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute an admission that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage device encoded with computer executable instructions, said instructions causing a computing device to execute a development framework, comprising:

a developer interface module configured to provide a development interface, the developer interface module comprising:
logic configured to receive a set of seed templates, each seed template identifying a command phrasing for use in invoking a particular function performed by a program, when spoken; and
logic configured to collect a set of added templates, each added template identifying another command phrasing for use in invoking the particular function,
the set of seed templates and the set of added templates forming an extended set of templates with all of the templates in the extended set providing a different command phrasing matched to a single user intent relative to the particular function;
a resource interface module configured to interact with one or more development resources to provide the set of added templates; and
a data store for storing the extended set of templates associated with the particular function,
the extended set of templates being for use in training one or more models for use on a user device, and said one or more models being applied to determine whether any phrase spoken by an end user is a member of the extended set so as to invoke the particular function.

2. The development framework of claim 1,
wherein the developer interface module further includes logic configured to receive description information, the description information providing a description of the particular function, and
wherein the data store also stores the description information.

3. The development framework of claim 2, wherein the description information includes one or more of:
a natural language description of the particular function; and
an identification of a handler function that is used to invoke the particular function.

4. The development framework of claim 1,
wherein, for one type of function, each command phrasing includes at least one slot for specifying variable slot information,
wherein the developer interface module further includes logic configured to identify at least one grammar, each grammar providing a mechanism for processing the variable slot information associated with a slot, and
wherein the data store also stores an identification of said at least one grammar.

5. The development framework of claim 1, wherein said at least one development resource is a crowdsourcing system, and wherein the crowdsourcing system is configured to:
present solicitation information to at least one crowdsourcing participant; and
receive one or more added templates from said at least one crowdsourcing participant, said at least one crowdsourcing participant providing said one or more added templates in response to the solicitation information.

6. The development framework of claim 1, wherein said at least one development resource is a paraphrasing system, and wherein the paraphrasing system is configured to:
receive at least one seed template; and
provide one or more added templates that are translations of said at least one seed template, said one or more added templates being expressed in a same language as said at least one seed template.

7. The development framework of claim 1, wherein the developer interface module further comprises logic configured to edit the extending set of templates.

8. The development framework of claim 1, further comprising a generation system comprising at least one training system configured to:
receive the extended set of templates; and
generate one or more models based on the extended set of templates.

9. The development framework of claim 8,
wherein the generation system is configured to combine the extended set of templates associated with the particular function with other extended sets of templates associated with other functions, to provide a master set of templates, and
wherein the generation system generates said one of more models based on the master set of templates.

10. The development framework of claim 8, wherein one training system comprises a statistical language model training system that is configured to provide a statistical language model for use by a speech recognition engine.

11. The development framework of claim 10, wherein the statistical language training system operates on the extended set of templates in a form in which slots are expressed as slot tokens.

12. The development framework of claim 8, wherein one training system comprises a vector space model training system that is configured to provide a vector space model for use by an intent determination engine.

13. The development framework of claim 12, wherein the vector space model training system determines a weight for each token in the extended set of templates by treating each template in the extended set as an expression of the single user intent.

14. The development framework of claim 8,
wherein the development framework is configured to update the extended set of templates by adding one or more user-provided templates provided by an end user, to provide an updated set of templates, and
wherein the generation system is configured to regenerate said one or more models based on the updated set of templates.

15. A method, implemented by one or more computer devices, comprising:
receiving description information, the description information providing a description of a particular function performed by a program resource;
receiving a set of seed templates, each seed template identifying a command phrasing for use in invoking the particular function, when the command phrasing is spoken;
providing a set of added templates using at least one development resource, each added template identifying another command phrasing for use in invoking the particular function,
the set of seed templates and the set of added templates comprising an extended set of templates with all of the templates in the extended set providing a different command phrasing matched to a single user intent relative to the particular function;
storing the description information and the extended set of templates in a data store,
said at least one development resource including at least a crowdsourcing system and a paraphrasing system; and
applying the extended set of templates to train one or more models for use in interpreting and responding to one or more spoken user commands when any phrase spoken by the user is a member of the extended set so as to invoke the particular function.

16. The method of claim 15, wherein each command phrasing includes at least one slot for specifying variable slot information, the method further comprising:
receiving an identification of at least one grammar, each grammar providing a mechanism for processing slot information associated with a slot; and
storing the identification of said at least one grammar.

17. A device, comprising:
a voice processing module for receiving a voice signal in response to a command spoken by a user, the voice processing module comprising:
a speech recognition engine configured to interpret the voice signal using a statistical language model, to provide a speech recognition result;
an intent determination engine configured to interpret the speech recognition result using an intent-matching model, to provide an intent determination result,
the intent determination result identifying a particular function to be performed by a program in response to the command spoken by the user;
logic configured to determine whether the speech recognition result and the intent determination result satisfy a prescribed test, to provide a determination result; and
a dispatch module configured to invoke a program resource that performs the particular function, upon an affirmative determination result,
the statistical language model and the intent-matching model being provided by a generation system based on a training corpus of templates, the templates comprising:
a set of seed templates with each seed template providing a different command phrasing matched to the intent determination result identifying the particular function; and
a set of added templates provided by one or more development systems, the set of added templates being related to the set of seed templates, such that each of the added templates provides a different command phrasing matched to the intent determination result identifying the particular function.

18. The device of claim 17, wherein the statistical language model is configured to generate a word sequence that represents a most likely interpretation of the voice signal.

19. The device of claim 18, wherein the statistical language model is further configured to:
identify at least one slot in the word sequence; and
apply a specified grammar to process slot information associated with said at least one slot.

20. The device of claim 18, wherein the intent matching model is configured to determine a template in the training corpus that most closely matches the word sequence identified by the statistical language model.

* * * * *